US012293730B2

(12) United States Patent
He et al.

(10) Patent No.: US 12,293,730 B2
(45) Date of Patent: May 6, 2025

(54) DISPLAY PANEL AND DISPLAY DEVICE

(71) Applicant: Xiamen Tianma Display Technology Co., Ltd., Xiamen (CN)

(72) Inventors: Shui He, Xiamen (CN); Jinjin Yang, Xiamen (CN); Jiansheng Zhong, Xiamen (CN); Qiaoling Zhong, Xiamen (CN); Ying Liu, Xiamen (CN); Shanshan Zheng, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/212,851

(22) Filed: Jun. 22, 2023

(65) Prior Publication Data

US 2024/0185807 A1 Jun. 6, 2024

(30) Foreign Application Priority Data

Nov. 30, 2022 (CN) ........................ 202211529732.0

(51) Int. Cl.
*G09G 5/10* (2006.01)
*G09G 3/34* (2006.01)

(52) U.S. Cl.
CPC ........... *G09G 3/342* (2013.01); *G09G 3/3413* (2013.01); *G09G 2320/068* (2013.01); *G09G 2320/0686* (2013.01)

(58) Field of Classification Search
CPC ................. G09G 3/342; G09G 3/3413; G09G 2320/068; G09G 2320/0686
USPC ........................................................ 345/690
See application file for complete search history.

(56) References Cited

U.S. PATENT DOCUMENTS

| | | | | |
|---|---|---|---|---|
| 2019/0013495 A1* | 1/2019 | Kim | .................. | H10K 59/8792 |
| 2021/0005845 A1* | 1/2021 | Kim | ..................... | H10K 59/879 |
| 2021/0027713 A1* | 1/2021 | Lee | ...................... | G09G 3/3233 |
| 2022/0140041 A1* | 5/2022 | Lee | ...................... | H10K 59/126<br>257/40 |
| 2022/0376209 A1* | 11/2022 | Tian | ..................... | H10K 50/858 |

* cited by examiner

*Primary Examiner* — Jennifer T Nguyen

(74) *Attorney, Agent, or Firm* — Anova Law Group, PLLC

(57) ABSTRACT

A display panel and a display device are provided. The display panel includes a first substrate; a light-emitting layer; and a light modulation layer. The light-emitting layer is located between the first substrate and the light modulation layer; the light modulation layer includes a first light modulation layer and a second light modulation layer; the light-emitting layer includes at least one light-emitting element; the first light modulation layer includes at least one first opening; an orthographic projection of the first opening on the first substrate overlaps an orthographic projection of the light-emitting element on the first substrate; the second light modulation layer covers the first opening; and a refractive index of the second light modulation layer is greater than a refractive index of the first light modulation layer.

20 Claims, 11 Drawing Sheets

DISPLAY PANEL AND DISPLAY DEVICE

CROSS-REFERENCE TO RELATED APPLICATION

This application claims the priority of Chinese Patent Application No. 202211529732.0, filed on Nov. 30, 2022, the content of which is incorporated by reference in its entirety.

TECHNICAL FIELD

The present disclosure generally relates to the field of display technologies and, more particularly, relates to a display panel and a display device.

BACKGROUND

With the continuous development of science and technology, more and more display devices with display panels are widely used in people's daily life and work, which bring great convenience to people's daily life and work, and have become indispensable essential tools.

In practical applications, when a user uses a display panel to view or process private image information in a public place or other environment, a narrow viewing angle is usually required to prevent other people from peeking at the relevant display content. Therefore, providing a display panel that can meet the privacy requirements of users and prevent others from peeking display content has become a technical problem to be solved urgently in the technical field of display devices. The present disclosed display panels and display devices are direct to solve one or more problems set forth above and other problems in the arts.

SUMMARY

One aspect of the present disclosure provides a display panel. The display panel includes a first substrate; a light-emitting layer; and a light modulation layer. The light-emitting layer is located between the first substrate and the light modulation layer; the light modulation layer includes a first light modulation layer and a second light modulation layer; the light-emitting layer includes at least one light-emitting element; the first light modulation layer includes at least one first opening; an orthographic projection of the first opening on the first substrate overlaps an orthographic projection of the light-emitting element on the first substrate; the second light modulation layer covers the first opening; a refractive index of the second light modulation layer is greater than a refractive index of the first light modulation layer; the display panel includes a first display area; the light modulation layer includes a first part; the first part is located in the first display area; in the first part, a first inclination angle is formed between a tangent of the contact point between a sidewall of the first opening and a bottom of the first opening and a bottom surface of the first light modulation layer; and a value of the first inclination angle is a range of approximately 50°-60°.

Another aspect of the present disclosure provides a display panel. The display panel includes a first display area. A brightness of the first display area at a first viewing angle is greater than a brightness of the first display area at a second viewing angle; a ratio of the brightness of the first display area at the second viewing angle to the brightness of the first display area under a normal viewing angle is not more than 30%; an angle between the first viewing angle and the first direction is smaller than an angle between the second viewing angle and the first direction; and the first direction is perpendicular to the display panel.

Another aspect of the present disclosure provides a display device. The display device includes a display panel. The display panel includes a first substrate; a light-emitting layer; and a light modulation layer. The light-emitting layer is located between the first substrate and the light modulation layer; the light modulation layer includes a first light modulation layer and a second light modulation layer; the light-emitting layer includes at least one light-emitting element; the first light modulation layer includes at least one first opening; an orthographic projection of the first opening on the first substrate overlaps an orthographic projection of the light-emitting element on the first substrate; the second light modulation layer covers the first opening; a refractive index of the second light modulation layer is greater than a refractive index of the first light modulation layer; the display panel includes a first display area; the light modulation layer includes a first part; the first part is located in the first display area; in the first part, a first inclination angle is formed between a tangent of the contact point between a sidewall of the first opening and a bottom of the first opening and a bottom surface of the first light modulation layer; and a value of the first inclination angle is a range of approximately 50°-60°.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

The structures, proportions, and sizes, etc. shown in the drawings of this specification are only used to match the content disclosed in the specification, for those who are familiar with this technology to understand and read, and are not used to limit the conditions that can be implemented in this application, so without technical substantive significance, any modification of the structure, change of the proportional relationship or adjustment of the size shall still fall within the scope of the content of the technology disclosed in the application without affecting the effect and purpose of the application.

DETAILED DESCRIPTION

The following will clearly and completely describe the embodiments of the present disclosure with reference to the drawings in the embodiments of the present disclosure. Obviously, the described embodiments are only some of the embodiments of the present disclosure, not all of them. Based on the embodiments in this disclosure, all other embodiments obtained by persons of ordinary skill in the art without making creative efforts belong to the scope of protection of this disclosure.

To make the above objects, features and advantages of the present disclosure more obvious and comprehensible, the present disclosure will be further described in detail below in conjunction with the accompanying drawings and specific implementation methods.

Figure 1:
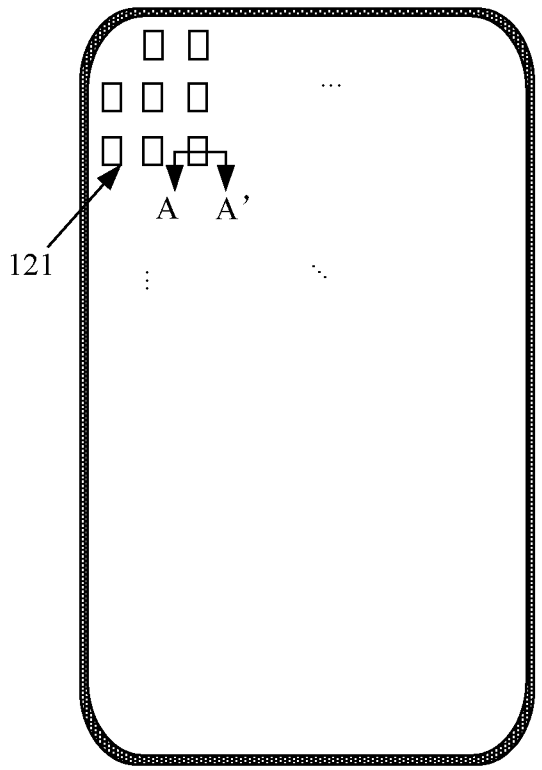
FIG. 1 illustrates a top view of an exemplary display panel according to various disclosed embodiments of the present disclosure.
Figure 2:
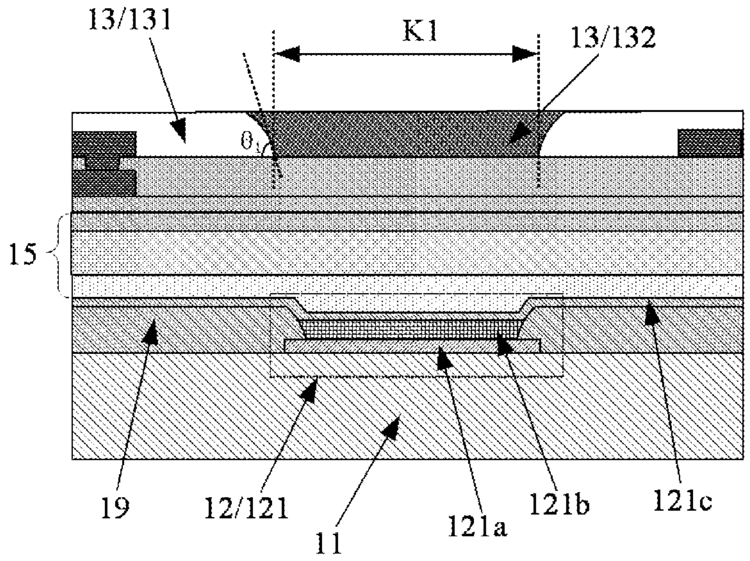
FIG. 2 illustrates an exemplary A-A'-sectional view of the display panel in FIG. 1.

FIG. 1 is a top view of an exemplary display panel provided by an embodiment of the present disclosure, and FIG. 2 is an A-A'-sectional view of the display panel in FIG. 1. As shown in FIG. 1 and FIG. 2, the display panel may include a first substrate 11, a light-emitting layer 12 and a light modulation layer 13.

The light-emitting layer 12 may be disposed between the first substrate 11 and the light modulation layer 13. The light modulation layer 13 may include a first light modulation layer 131 and a second light modulation layer 132. The light-emitting layer 12 may include at least one light-emitting element 121. The light modulation layer 131 may include at least one first opening K1. The orthographic projection of the first opening K1 on the first substrate 11 may overlap the orthographic projection of the light-emitting element 121 on the first substrate 111. The second light modulation layer 132 may cover the first opening K1. The refractive index of the second light modulation layer 132 may be greater than the refractive index of the first light modulation layer 131.

The display panel may include a first display area. The light modulation layer 131 may include a first part. The first part may be located in the first display area. In the first part, the tangent of the contact point between the sidewall of the first opening K1 and the bottom of the first opening K1 may have a first inclination angle θ1 with the bottom surface of the light modulation layer 131. The value of the first inclination angle θ1 may be in a range of approximately 50°-60°.

In one embodiment of the present disclosure, the display panel may include the first light modulation layer 131 and the second light modulation layer 132. Based on the fact that the first light modulation layer 131 and the second light modulation layer 132 may form a microlens structure (MLP) that may be able to modulate the propagation direction of the light emitted by the light-emitting element 121 at the light-exiting side of the light-emitting element 121, the mechanism of adjusting the direction of the light propagation is illustrated in FIG. 3.

As shown in FIG. 2, in the direction where the first substrate 11 points to the light modulation layer 13, the light-emitting element 121 may include an anode 121*a*, a light-emitting layer 121*b* and a cathode layer 121*c* arranged in sequence. All light-emitting elements 121 may use a same light-transmitting conductive layer as a common cathode layer. The anode 121*a* may be located on the surface of the first substrate 11. A pixel definition layer 19 may be disposed on the side of the anode 121*a* away from the first substrate 11, and the pixel definition layer 19 may include a pixel opening exposing a portion of the anode 121*a*, and the pixel opening may correspond to the light-emitting element 121 one-by-one. The light-emitting layer 121*b* of the light-emitting element 121 may be located in the corresponding pixel opening and on the surface of the anode 121*a*. The cathode layer 121*c* may cover the light-emitting layer 121*b* and the surface of the pixel definition layer 19 facing away from the first substrate 11. An encapsulation layer 15 may be formed on the cathode layer 121*c*, and the structure of the encapsulation layer 15 may be referred to the description below.

In the subsequent embodiments, the structure of the light-emitting element 121 may refer to the embodiment shown in FIG. 2, and no separate diagrams and text descriptions will be made in the subsequent embodiments.

Figure 3:
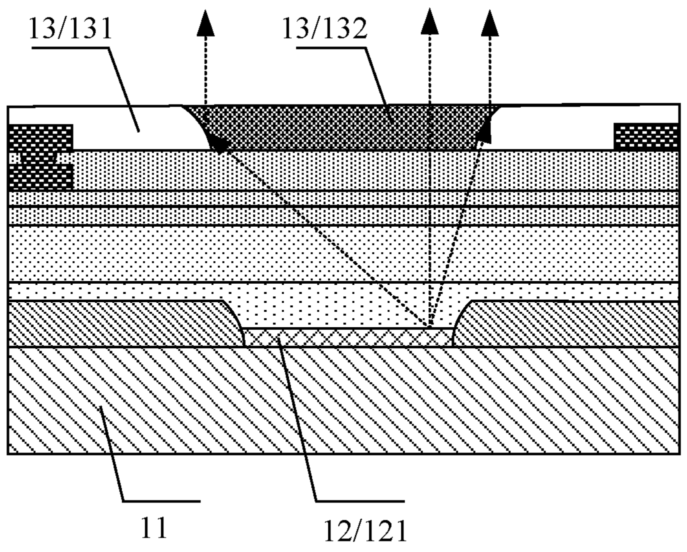
FIG. 3 illustrates the light-adjusting mechanism of the display panel in FIG. 2.

FIG. 3 is a schematic diagram of the principle of the light modulation of the display panel in FIG. 2. As shown in FIG. 2 and FIG. 3, the first light modulation layer 131 and the second light modulation layer 132 may form a microlens on the light-exiting surface of the light-emitting element 121. The microlens may be able to adjust the propagating direction of the light emitted by the light-emitting element 121 to adjust the viewing angle of the first display area. In FIG. 3, the dotted arrows indicate the light propagation paths. The microlens structure may include an interface between the first light modulation layer 131 and the second light modulation layer 132 on the sidewall of the first opening K1.

Taking the light emitted from the right end of the light-emitting element 121 shown in FIG. 3 as an example, for the light path illustrated with the dashed arrow, when the light emitted from the light-emitting element 121 enters from the second light modulation layer 132 with the larger reflect index into the sidewall interface of the first opening k1, if the incident angle is greater than the critical angle of a total reflection, the total reflection may occur, and the light after the total reflection may emit from the second light modulation layer 132 and be deflected towards the middle area of the light-emitting element 121, and the convergence of the large-angle emission of light from the light-emitting element 121 may be achieved. For the light path indicated by the dashed arrow on the right, when the light emitted by the light-emitting element 121 enters the sidewall surface of the first opening K1 from the first light modulation layer 131 with a low refractive index, the light may be refracted, and the refracted light may emit from the second light modulation layer 132, and may be deflected toward the middle area of the light-emitting element 121 to achieve the light convergence. As shown in FIG. 3, for the optical path indicated by the dashed arrow in the middle area, and the vertical emitting light may not change the emitting direction.

As shown in FIG. 3, by adjusting the relevant setting parameters of the first light modulation layer 131 and the second light modulation layer 132, the desired light converging effect may be achieved, and different degrees of light converging may be realized.

Moreover, the value of the first inclination angle θ1 may be in a range of approximately 50°-60°. Within such an angle range, the microlens structure on the light-exiting side of the light-emitting element 121 in the first display area may make more light emitted by the light-emitting element 121 with a smaller angle emission such that the viewing angle range of the first display area may be relatively small, and the realization principle is shown in FIG. 3. Accordingly, using the microlens structure may converge the light angle of the light emitted by the light-emitting element 121 to the middle area; and the degree of visibility of the content displayed in the first display area by others within the wide viewing angle range may be reduced. Thus, the effect of anti-peeping when displaying images in the first display area may be achieved.

In one embodiment of the present disclosure, the light-emitting element 121 may be an OLED element or a micro LED element. The micro LED element may be a micro LED or a mini LED. The implementation manner of the light-emitting element 121 is not limited in the embodiment of the present disclosure.

Figure 4:
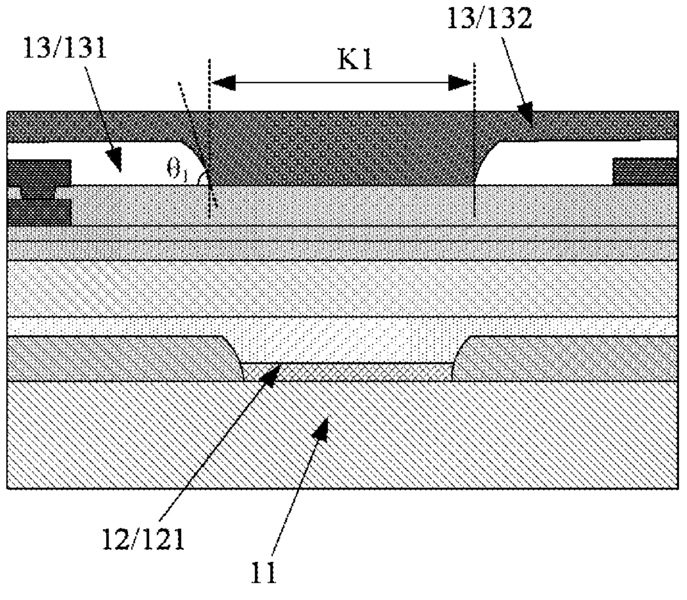
FIG. 4 illustrates a cross-sectional view of an exemplary display panel according to various disclosed embodiments of the present disclosure.

FIG. 4 is a cross-sectional view of an exemplary display panel provided by the embodiment of the present disclosure. As shown in FIG. 4, based on the structure shown in FIG. 1 and FIG. 2, the second light modulation layer 132 of the display panel may also cover a side surface of the first light modulation layer 131 away from the first substrate 11.

In the manner shown in FIG. 4, the second light modulation layer 132 may fill the first opening K1 and cover the surface of the first light modulation layer 131 facing away from the first substrate 11. Such a configuration may can improve surface flatness.

Figure 5:
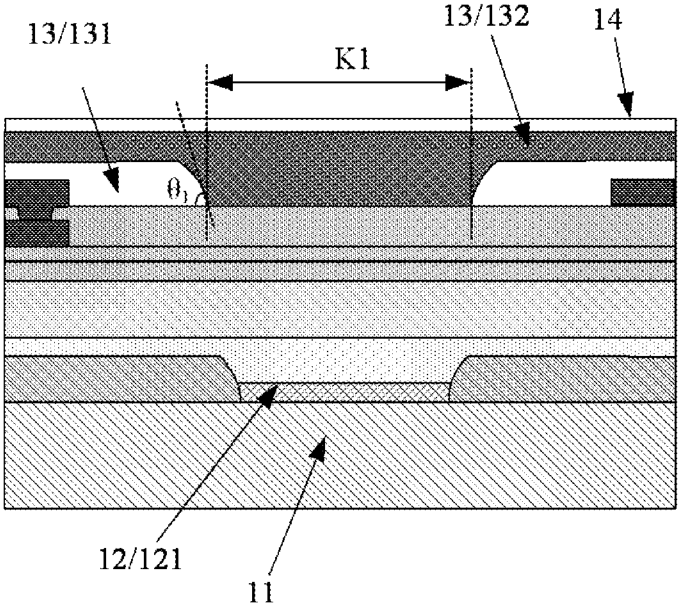
FIG. 5 illustrates a cross-sectional view of another exemplary display panel according to various disclosed embodiments of the present disclosure.

FIG. 5 is a cross-sectional view of another exemplary display panel provided by the embodiment of the present disclosure. As shown in FIG. 5, based on the embodiment in FIG. 4, the display panel may also include a polarizer 14. The polarizer 14 may be located on the side of the light modulation layer 13 away from the first substrate 11, and may be configured to reduce the reflection of the display panel on the ambient light, and to avoid the influence of ambient light on the display effect.

In some embodiments, the polarizer 14 may also be provided on the basis of the manner shown in FIG. 2, which will not be repeated in this embodiment of the present disclosure.

In the embodiment of the present disclosure, other methods may also be used to reduce the reflection of the display panel to ambient light, not limited to the solution of using polarizers. For example, a color resist with the same color with the color emitted by the light-emitting element 121 may be disposed on the light-exiting side of the display element 121 to reduce the reflection of the display panel to the ambient light.

In the configuration shown in FIGS. 2-5, only one light-emitting element 121 in the first display area and the first part of the corresponding light modulation layer 13 are shown. It is easy to know that there may be a plurality of light-emitting elements 121 in the first display area, and the light modulation layer 131 corresponding to the light-emitting elements 121 in the first display area may all be provided with the first openings K1.

To achieve a better light modulation effect, for the light-emitting elements in the first display area and the second display area described later, each light-emitting element 121 may be provided with a first opening K1 correspondingly above it. In other embodiments, one first opening 1 may also be provided on the light-exiting side of the plurality of light-emitting elements 121.

Figure 6:
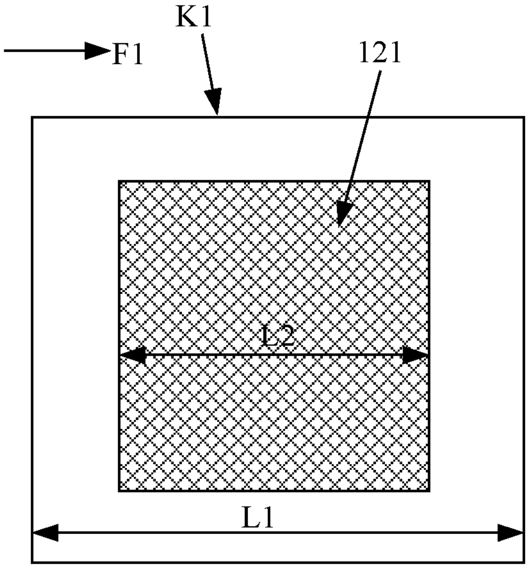
FIG. 6 illustrates an exemplary top view of a first opening and a light-emitting element according to various disclosed embodiments of the present disclosure.

FIG. 6 is an exemplary top view of a first opening and a light-emitting element provided by an embodiment of the present disclosure. As shown in FIG. 6 and referring to any one of FIG. 2, FIG. 4 and FIG. 5, in the first part, the size of the first opening K1 in the first preset direction and the size of the light-emitting element 121 in the first preset direction F1 may have a first size difference, and the value of the first size difference may be in a range of approximately 0-2 microns, including endpoint value. The first preset direction F1 may include at least one direction parallel to the plane where the display panel is located. The first preset direction F1 may be parallel to the first substrate 11. FIG. 6 uses the manner that the first preset direction F1 is the horizontal direction as an example. In other embodiment, the first preset direction F1 may be any direction parallel to the first substrate 11.

The first size difference may be substantially small, which may achieve a better converging effect of light emitted by the light-emitting element 121 in the first display area, thereby reducing the brightness at a large viewing angle and better realizing the anti-peeping effect. If the first size difference is significantly large, as the optical path shown by the dotted arrow in FIG. 3, the distance between the sidewall of the first opening k1 and the edge of the light-emitting element 121 in the first preset direction F1 is relatively large, the light that could have irradiated the sidewall of the first opening K1 may be unable to be irradiated on the sidewall of the first opening K1, or although it may be irradiated to the sidewall of the first opening K1, the incident angle may changes. Thus, the convergence of the light toward the middle area of the light-emitting element 121 may not be achieved; and the light convergence effect may be affected.

In FIG. 6, the configuration that the orthographic projections of the first opening K1 and the light emitting element 121 on the first substrate 11 are both rectangular is used as an example for illustration. In the first part, the size of the first opening K1 in the first preset direction may be L1, and the size of the light-emitting element 121 in the first preset direction may be L2. Based on the above description, the first size difference d1 is:

$$d1=L1-L2$$

The absolute value of the first size difference d1 may be in a range of approximately ranges 0-2 microns.

Figure 7:
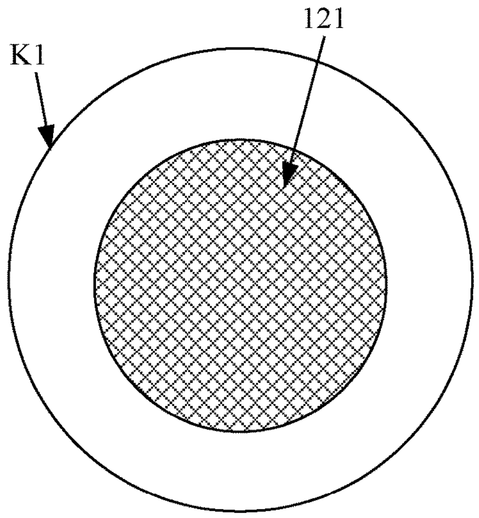
FIG. 7 illustrates another exemplary top view of a first opening and a light-emitting element according to various disclosed embodiments of the present disclosure.

FIG. 7 is an exemplary top view of the first opening and the light-emitting element provided by the embodiment of the present disclosure. The difference from the configuration shown in FIG. 6 is that, in the configuration shown in FIG. 7, the orthographic projections of the first opening K1 and the light-emitting element 121 on the first substrate 11 may all be circular. In such a manner, the difference between the size of the first opening K1 in the first preset direction and the size of the light-emitting element 121 in the first preset direction may also be set in a range of approximately 0-2 microns such that the light emitted from the light-emitting element 121 in the first area may achieve a better converging effect, thereby reducing the brightness at a large viewing angle and better realizing the anti-peeping effect.

The shapes of the first opening K1 and the light-emitting element 121 may be set based on the practical requirements, and are not limited to the rectangular structure shown in FIG. 6 and the circular structure shown in FIG. 7. The embodiment of the present disclosure does not limit the shapes of the first opening K1 and the light-emitting element 121.

To facilitate the alignment of the first opening K1 and the corresponding light-emitting element 121, the orthographic geometric figures of the first opening K1 and the light-emitting element 121 on the first substrate 11 may be set to be similar, and the centers of the corresponding geometric figures of the two orthographic projections may coincide.

When the geometric centers of the orthographic projections corresponding to the first opening K1 and the light-emitting element 121 coincide, in the first preset direction, the distance between the opposite sides of the light-emitting element 121 and the opposite edge of the first opening K1 may be half of the above difference.

It should be noted that, in the embodiment of the present disclosure, the size of the first opening K1 may be defined by the bottom edge of the first opening K1, and the size of the light-emitting element 121 may be defined by the bottom edge of the light-emitting element 121, such that the size of the first opening K1 and the light-emitting element 121 may be determined. When the light-emitting element 121 is an OLED element, its size may be the size of the bottom of the pixel opening in the pixel definition layer.

Figure 8A:
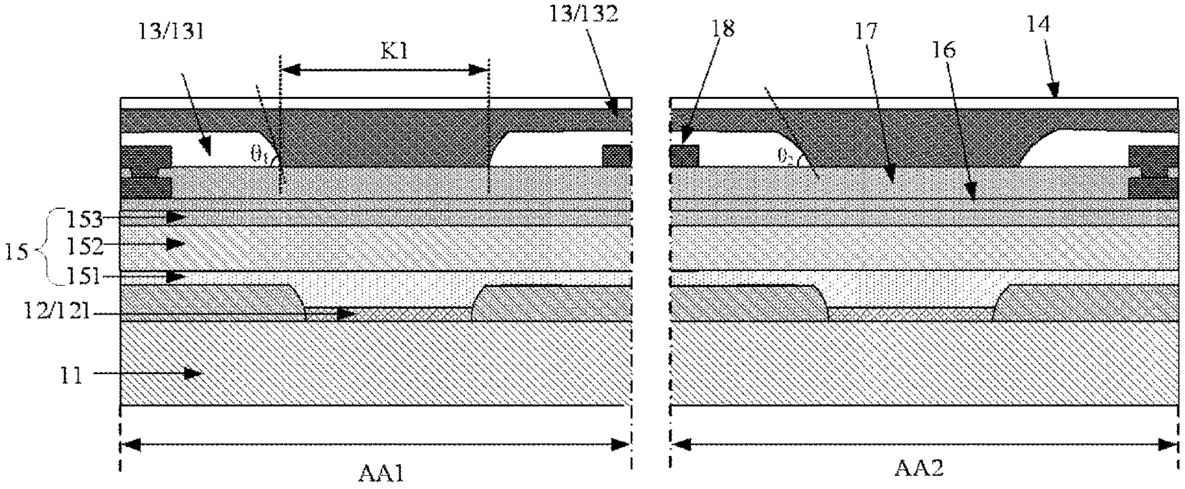
FIG. 8*a* illustrates a cross-sectional view of another exemplary display panel according to various disclosed embodiments of the present disclosure.

FIG. 8*a* is a cross-sectional view of another exemplary display panel provided by one embodiment of the present disclosure. As shown in FIG. 8, based on the above embodiment, the display panel may include a first display area AA1, and the light modulation layer 13 may include a first part in the first display area AA1. The display panel may further include a second display area AA2, the light modulation layer 13 may include a second part, and the second part may be located in the second display area AA2. In the second part, there may be a second inclination angle θ2 between the tangent of the contact point between the sidewall of the first opening K1 and the bottom of the first opening K1 and the bottom surface of the first light modulation layer 131. The second inclination angle θ2 may be less than approximately 50° or greater than approximately 60°. It should be noted that, in FIG. 8*a*, the configuration that the second inclination angle θ2 is greater than the first inclination angle θ1 is taken as an example for illustration, that is, the value of the first inclination angle θ1 may be in a range of approximately 50°-60° and the second inclination angle θ2 may be less than 50°. The second inclination angle θ2 may also be set to be greater than the first inclination angle θ1. At this time, the value of the first inclination angle θ1 may be in a range of approximately 50°-60°, and the second inclination angle θ2 may be greater than 60°.

For ease of illustration, in the manner shown in FIG. 8*a*, only one light emitting element 121 in the first display area AA1 and the second display area AA2, and the first part and the second part of the corresponding light modulation layer 13 are shown. It is easy to know that there may be multiple light-emitting elements 121 in the first display area AA1 and the second display area AA2, and the light-emitting elements 121 in the first display area AA1 and the second display area AA2 corresponding to the light modulation layer 131 may all be provided with first openings K1.

In FIGS. 1-5 and FIG. 8*a*, the display panel may be an OLED panel, and the light-emitting element 121 may be an OLED element.

As shown in FIG. 8*a*, an encapsulation layer 15 may be disposed on the side of the light-emitting layer away from the first substrate 11. The encapsulation layer 15 may include an inorganic layer and an organic layer stacked together. In one embodiment, the encapsulation layer 15 may include a first inorganic layer 151, an organic layer 152 and a second inorganic layer 153 stacked in sequence. The first inorganic layer 151 may be located on the side of the organic layer 152 facing the first substrate 11, and the second inorganic layer 152 may be located on the side of the organic layer 152 facing the light modulation layer 13.

In one embodiment, the display panel may further include a patterned touch electrode layer 18, and the orthographic projection of the touch electrode layer 18 on the first substrate 11 may not overlap with the orthographic projection of the light-emitting element 121 on the first substrate 11 to prevent the touch electrode layer 18 from affecting the display effect. The touch electrode layer 18 may be located between the first light modulation layer 131 and the encapsulation layer 15.

In one embodiment, the touch electrode layer 18 may include two touch metal layers of different layers, respectively forming the touch electrodes and the bridge structures connecting the touch electrodes. A buffer layer 16 may be disposed on the side of the encapsulation layer 15 away from the first substrate 11. The first layer of touch metal layer may be located on the side of the buffer layer 16 away from the first substrate 11, and a side of the first layer of touch metal layer facing away from the first substrate 11 may be covered with an insulating layer 17. The second layer of touch metal layer may located on a side of the insulating layer 17 away from the first substrate 11, and the first light modulation layer 131 may cover the second touch metal layer.

Figure 8B:
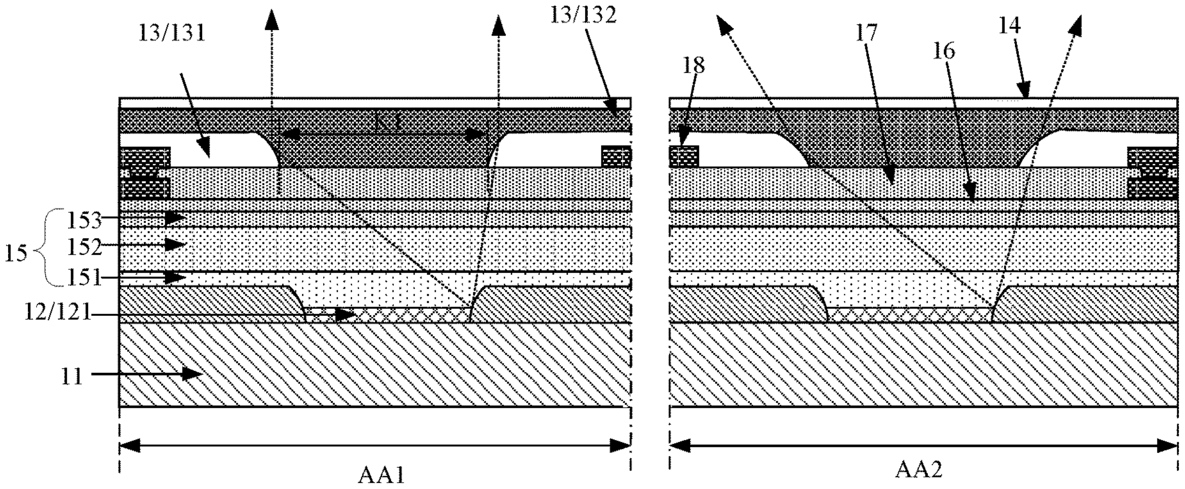
FIG. 8*b* illustrates the viewing angle ranges of the two viewing areas of the display panel in FIG. 8*a;*
Figure 9:
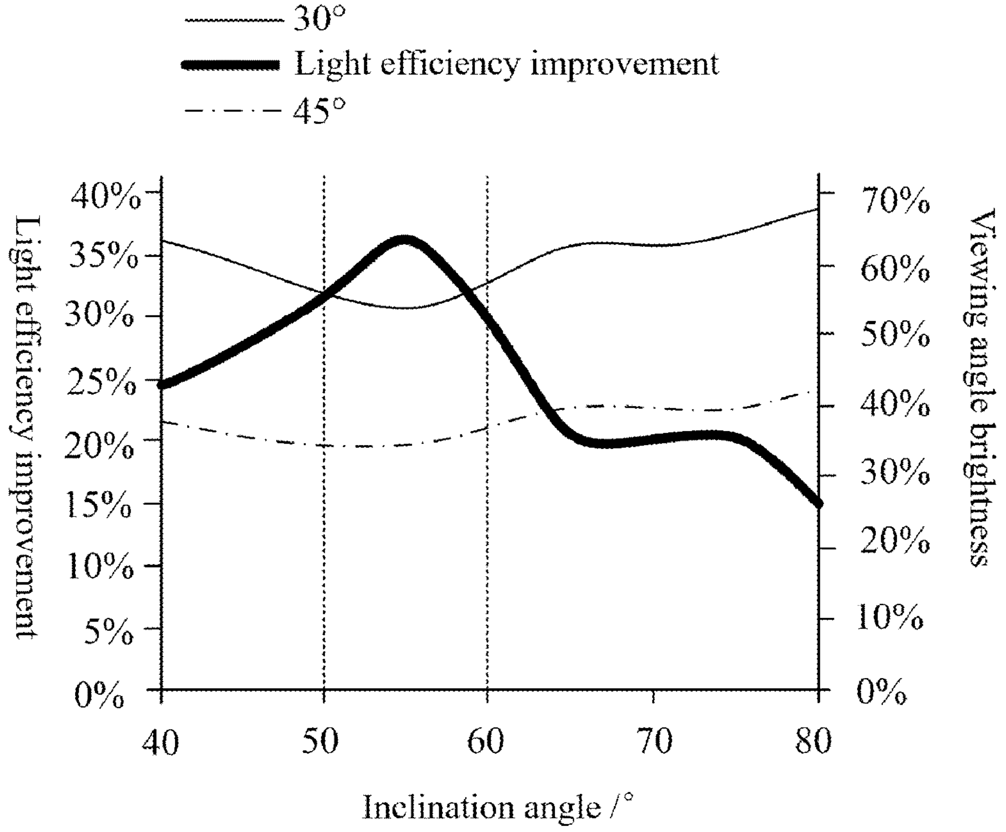
FIG. 9 illustrates the simulation results of the display effect of another exemplary display panel according to various disclosed embodiments of the present disclosure.

FIG. 8*b* is a schematic diagram of the viewing angle ranges of the two display areas in the display panel in FIG. 8*a*, and FIG. 9 is a simulation graph of the display effect of an exemplary display panel provided by one embodiment of the present disclosure. As shown in FIG. 8*b* and FIG. 9 and referring to FIG. 8*a*, the dotted arrows in FIG. 8*b* are used to indicate the transmission path of the light emitted from the right end of the light-emitting element 121. The thick solid line in FIG. 9 may be referred to as a first curve indicating the effective improvement curve, the thin solid line in FIG. 9 may be referred to as a second curve indicating the viewing angle brightness curve at 30°, and the dotted line may be referred to as a third curve representing the viewing angle brightness curve when the viewing angle is 45°. The inclination angle shown on the horizontal axis in FIG. 9 may represent the first inclination angle θ1, and may also represent the second inclination angle θ1 hereinafter.

In the first display area AA1, the value of the first inclination angle θ1 corresponding to the first part may be in a range of approximately 50°-60°. Based on the second curve and the third curve in FIG. 9, the viewing angle brightness at a viewing angle of 30° may be greater than the viewing angle brightness at a viewing angle of 45°. The first part of the light modulation layer 13 may have a greater effect on improving the light efficiency of the light-emitting element 121 at a small viewing angle. It can be seen that in the first display area AA1, when the value of the first inclination angle θ1 is in a range of approximately 50°-60°, it may make the brightness larger at a small viewing angle. The first display area AA1 may have a narrow viewing angle range. Accordingly, the first display area AA1 may realize anti-peeping display. Moreover, based on the first curve, it can be seen that when the value of the first inclination angle θ1 is in a range of approximately 50°-60°, the improvement effect of the light modulation layer 13 on the light efficiency of the light-emitting element 121 may be significant, and when the same display brightness requirement is achieved, the first display area AA1 may have a lower power consumption. Based on the light propagation path shown by the dotted arrow in FIG. 8*b*, it can be seen that in the first display area AA1, the convergence degree of light may be relatively large, and the viewing angle range may be relatively small, and the second display area AA2 may have a poor light convergence effect, and the viewing angle range may be relatively large, and the analysis effect of the simulation graph in FIG. 9 on the description of the viewing angles of the two display areas may be consistent.

The value of the first inclination angle θ1 corresponding to the first part may be in a range of approximately 50°-60°, and when the second inclination angle θ2 is set to be less than 50° or greater than 60° in the second part, based on the second curve or the third curve, it can be seen that, under a same viewing angle, the viewing angle brightness of the first display area AA1 may be smaller than the viewing angle brightness of the second display area AA2. For example, under the same viewing angle, the display brightness of the first display area AA1 may smaller than that of the second display area AA2. Accordingly, at a large viewing angle, the display brightness of the first display area AA1 may be lower than that of the second display area AA2, the anti-peep display at a small viewing angle may be realized through the first display area AA1, and a large viewing angle may be realized through the second display area AA2. The viewing angle range of the display panel may be increased through the second display area AA2, and the user may share and display the display content through the second display area AA2, and other people around the user with a large viewing angle may watch the display content in the second display area AA2.

From the above description, it can be seen that the display panel may realize anti-peeping display through the first display area AA1, and realize sharing display with a large viewing angle through the second display area AA2. Thus, different display areas of the display panel may realize different display requirements, and may meet different needs of users at different scenes.

In one embodiment, the value of the second inclination angle θ2 may be in a range of approximately 40°-50°, or the value of the second inclination angle θ2 may be in a range of approximately 60°-80°. When the second inclination angle θ2 is within the above range of angle values, it may be possible to make the second display area AA2 to have a larger viewing angle brightness, and improve the viewing angle brightness under a large viewing angle. Based on the curve shown in FIG. 9, it can be seen that when the value of the second inclination angle θ2 is in a range of approximately 40°-50° or 60°-80°, the viewing angle brightness of the second display area AA2 may be effectively improved, and the viewing angle range of the second display area AA2 may be increased; and the second display area AA2 may realize a large viewing angle display.

In the embodiment of the present disclosure, in the first display area AA1, the first inclination angles θ1 corresponding to the light-emitting elements 121 of different light-emitting colors may be the same. Accordingly, the light-emitting elements 121 in the first display area AA1 may correspond to a same first inclination angle θ1, which may be convenient to form the first opening K1 in the first display area AA1. In other manners, in the first display area AA1, the first inclination angles θ1 corresponding to the light-emitting elements 121 of different light-emitting colors may be different, and the first inclination angles θ1 corresponding to the light-emitting elements 121 of the same light emitting color may be same.

In the second display area AA2, the second inclination angles θ2 corresponding to the light-emitting elements 121 of different light-emitting colors may be same. Accordingly, the light-emitting elements in the second display area AA2 may correspond to a same second inclination angle θ2, which may be convenient for forming the first opening K1 in the second display area AA2. In other embodiments, in the second display area AA2, the second inclination angles θ2 corresponding to the light-emitting elements 121 of different light-emitting colors may also be different, and the second inclination angles θ2 corresponding to the light-emitting elements 121 of a same light-emitting color may be same.

Figure 10:
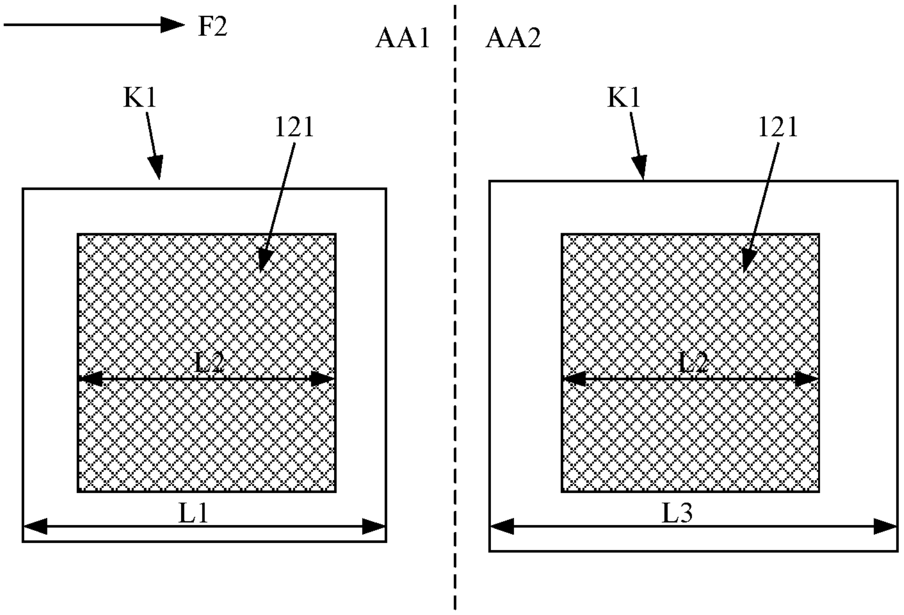
FIG. 10 illustrates another exemplary top view of a first opening and a light-emitting element according to various disclosed embodiments of the present disclosure.

FIG. 10 is a top view of another first opening and light-emitting element provided in one embodiment of the present disclosure. As shown in FIG. 10, in such a configuration, the absolute value of the first size difference may range from 0 to 2 microns. In the second part, the size of the first opening K1 in the second preset direction F2 and the size of the light-emitting element 121 in the second preset direction F2 may have a second size difference, and the absolute value of the second size difference may be greater than 2 microns. The second preset direction F2 may include at least one direction parallel to the plane where the display panel is located. In the manner shown in FIG. 10, the configuration that the second preset direction F2 is the horizontal direction is used as an example for illustration. It may be easy to know that the second preset direction F2 may be any direction parallel to the plane where the display panel is located. The second preset direction F2 may be the same as or different from the above-mentioned first preset direction F1.

In the manner shown in FIG. 10, in combination with any one of the embodiments shown in FIG. 2, FIG. 4 and FIG. 5, the configuration that the orthographic projections of the first opening K1 and the light-emitting element 121 on the first substrate 11 are both rectangular is used as an example for illustration.

In the first part, the absolute value of the first size difference d1 may be in a range of approximately 0-2 μm. The first size difference d1 corresponding to the light-emitting elements 121 of different light colors may be same or different. In the second part, the absolute value of the second size difference d2 may be greater than 2 μm, and the second size difference d2 corresponding to the light-emitting elements 121 of different light colors may be same or different.

The comparison between the first size difference d1 and the second size difference d2 will be described below using the size difference corresponding to the light-emitting elements 121 with the same size L2. Because the size difference may be the edge distance difference between the first opening K1 and the orthographic projection of the light-emitting element 121 on the first substrate 11. Thus, in some embodiments, the size difference corresponding to the light-emitting elements 121 of different sizes may also be used to perform a comparison between the first size difference d1 and the second size difference d2.

The second portion of the light modulation layer 13 may be located in the second area AA2. In the second part, the size of the first opening K1 in the second preset direction F2 may be L3, and for the light-emitting elements 121 with the same size L2, based on the above description, the second size difference d2 may be:

$$d2=L3-L2$$

The absolute value of the second size difference d2 may be greater than 2 microns. In one embodiment, the absolute value range of the second size difference d2 may be set to be 2 microns to 4 microns, including the endpoint value. In such a value range, on the one hand, the second display area AA2 may have a large viewing brightness while having a large viewing angle. On the other hand, when the size of the light-emitting element 121 is constant, it may avoid the excessively large size of the first opening K1 from affecting the layout space of the first opening K1 corresponding to other adjacent light-emitting elements 121, or the excessively small size of the first opening K1 from affecting the light efficiency improvement effect of the micro-lens structure on the light-emitting element 121.

In one embodiment, in the first display area AA1, the sizes of the first openings K1 corresponding to the light-emitting elements 121 of the same size may be same and the sizes of the first openings K1 corresponding to the light-emitting elements 121 of different sizes may be different to facilitate forming the first openings K1 in the first display area AA1. In the second display area AA2, the sizes of the first openings K1 corresponding to the light-emitting elements 121 of a same size may be same and the sizes of the first openings K1 corresponding to the light-emitting elements 121 of different sizes may different to facilitate forming the first opening K1 in the second display area AA2.

In the embodiment of the present disclosure, d1 and d2 may be positive or negative numbers. For example, the orthographic projection of the light-emitting element 121 on the first substrate 11 may be located within the orthographic projection of the corresponding first opening K1 on the first substrate 11. In some embodiments, the orthographic projection of the first opening K1 on the first substrate 11 may be located within the orthographic projection of the corresponding light-emitting element 121 on the first substrate 11.

In one embodiment, as shown in FIG. 10, for the light-emitting elements 121 of the same light-emitting color, d1 may be set to be smaller than d2, such that the viewing brightness of the second display area AA2 may be raised at large viewing angles while enabling the first display area AA1 to realize the anti-peeping display. Accordingly, the display brightness at the large viewing angles may be increased.

Figure 11:
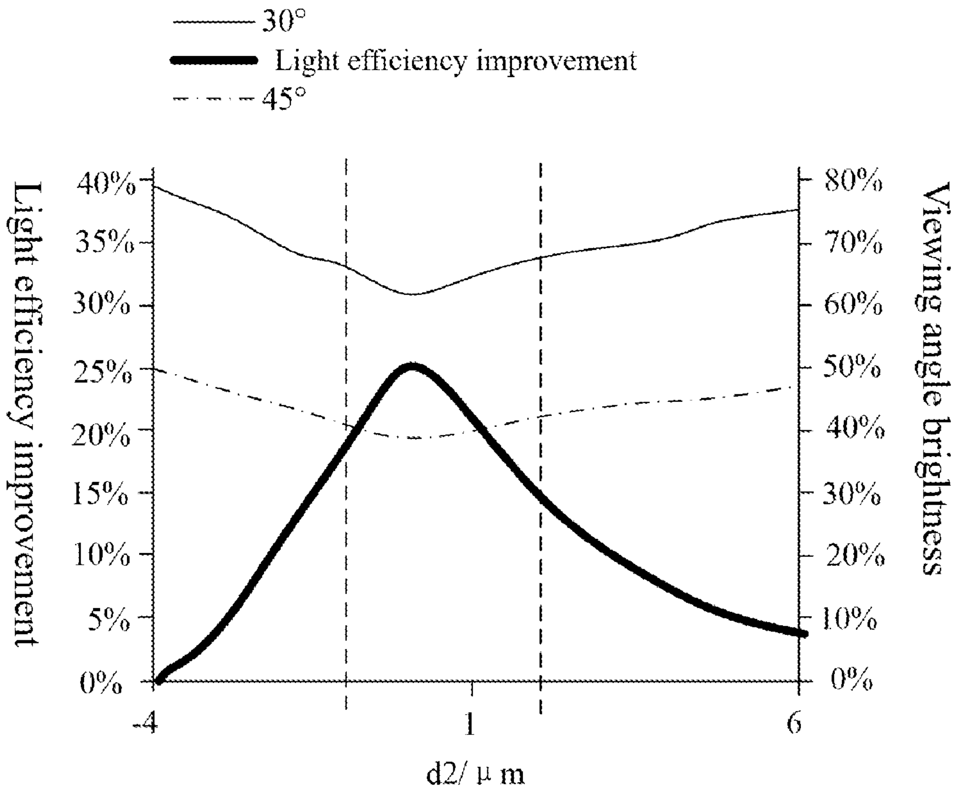
FIG. 11 illustrates the simulation results of the display effect of another exemplary display panel according to various disclosed embodiments of the present disclosure.

FIG. 11 is a simulation curve diagram of the display effect of another exemplary display panel provided by the embodiment of the present disclosure. As shown in FIG. 11, the thick solid line may be referred to as a first curve indicating the light efficiency improvement curve. The thin solid line may be referred to as a second curve representing the viewing angle brightness curve when the viewing angle is 30°. The dotted line may be referred to as a third curve, representing the viewing angle brightness curve when the viewing angle is 45°. The simulation curve corresponding to the manner shown in FIG. 10 may be shown in FIG. 11.

When the absolute value of the first size difference d1 ranges from 0 to 2 μm (corresponding to the area between the two vertical dashed lines in FIG. 11), as shown as the second and third curves in FIG. 11, the viewing angle brightness of the first display area AA1 may be relatively large at a viewing angle of 30°, and the viewing angle brightness at a viewing angle of 45° may be relatively small. Thus, when the absolute value range of the first size difference d1 is set to 0 to 2 μm, combined with the above-mentioned value range of the first inclination angle θ1, the viewing angle brightness of the first display area AA1 at a large viewing angle may be made smaller, and the viewing angle brightness may be larger at a small viewing angle. Thus, the first display area AA1 may have a narrower viewing angle range, and the first display area AA1 may realize the anti-peeping display. As shown as the first curve in FIG. 11, when the absolute value of the first size difference d1 ranges from 0 to 2 μm, the light efficiency may be greatly improved, when the same display brightness requirement is achieved, the first display area AA1 may have a lower power consumption.

When the absolute value range of the first size difference d1 is 0-2 μm, and the absolute value range of the second size difference d2 is greater than 2 μm, as shown as the third curve, the viewing angle brightness corresponding to the light-emitting element 21 in the first display area AA1 may be smaller than the viewing angle brightness corresponding to the light-emitting element 121 in the second display area AA2. For example, when the light-emitting elements 121 are controlled by a same driving current, the light-emitting elements 121 of a same light-emitting color in the first display area AA1 and the second display area AA2 may have a same light-emitting brightness. However, because the light-adjusting effect of the microlens may be different, the display brightness of the light-emitting elements 121 in the first display area AA1 may be smaller than the display brightness of the light-emitting elements 121 in the second display area AA2. When the absolute value of the first size difference is set to be smaller than the absolute value of the second size difference, based on the above-mentioned angle ranges of the inclination angles of the two display areas, on the one hand, for the light-emitting elements 121 in the first display area AA1, in a same light-emitting time, the small viewing angle may have a larger display brightness, and the large viewing angle may have a smaller display brightness. Accordingly, the first display area AA1 may have the function of anti-peeping display. On the other hand, comparing the second display area AA2 with the first display area AA1, the light-emitting element 121 may be controlled by the same driving current, the light-emitting brightness of the light-emitting elements 121 of a same light-emitting color in the first display area AA1 and the light-emitting brightness of the light-emitting elements 121 of a same light-emitting color in the second display area AA2 may be same. However, the light-adjusting effect of the microlens may be different, and comparing the second display area AA2 with the first display area AA1, a larger viewing angle may have larger brightness. Thus, the display brightness of the second display area AA2 at a large viewing angle may be further increased.

The value of the first inclination angle θ1 may be set to be in a range for approximately 50°-60°, and when the second inclination angle θ2 is less than 50° or greater than 60°, the display brightness of the first display area AA1 may be smaller than the display brightness of the second display area AA2 at a large viewing angle. Thus, the anti-peeping display may be achieved through the first display area AA1, and the viewing angle range of the display panel may be increased through the second display area AA2. At this time, the absolute value of the first size difference d1 may smaller than the absolute value of the second size difference d2, or the absolute value of the first size difference d1 may be same as the absolute value of the second size difference d2.

In one embodiment, to further improve the anti-peep display effect of the first display area AA1 and the large viewing angle display brightness of the second display area AA2, the value of the first inclination angle θ1 may be set to be in a range of approximately 50°-60°. When the second inclination angle θ2 is less than 50° or greater than 60°, the absolute value of the first size difference d1 may be set to be smaller than the absolute value of the second size difference d2. For example, as shown in Table 1 below, the absolute value range of the first size difference may be 0-2 μm, and the value of the second size difference may be greater than 2 μm.

TABLE 1

| | First display area AA1 | Second display area AA2 |
|---|---|---|
| Inclination angle | $50° \leq \theta_1 \leq 60°$ | $\theta_2 > 60°$,或 $\theta_2 < 50°$ |
| Size difference/μm | $0 \leq d1 \leq 2$ | $d2 > 4$ |
| 30° viewing angle brightness | ≈30% | ≈60% |
| 45° viewing angle brightness | ≈12% | ≈20% |

Based on Table 1, it can be seen that, in the first display area AA1, most of the light with a large viewing angle may be converged at the front viewing angle, and the brightness at the large viewing angle may be relatively small. In the second display area AA2, less light with the large viewing angle may be converged at the front viewing angle, and the viewing angle brightness of the large viewing angle may be relatively large.

In one embodiment of the present disclosure, in the first part, the refractive index of the second light modulation layer 132 and the refractive index of the first light modulation layer 131 may have a first refractive index difference Δn1; and in the second part, the refractive index of the second light modulation layer 132 and the refractive index of the first light modulation layer 131 may have a second refractive index difference Δn2. The first refractive index difference Δn1 and the second refractive index difference Δn2 may be different, for example, Δn1≠Δn2. When setting the value of the first inclination angle θ1 in a range of approximately 50°-60°, and setting the second inclination angle θ2 to less than 50° or greater than 60°, and at same time, setting Δn1≠Δn2, the peep-proof display effect of the first display area AA1 may be further improved, and the large viewing angle brightness of the second display area AA2 may be increased. Under such a condition, for the light-emitting elements 121 of the same light-emitting color, d1 may be equal to d2, or d1<d2.

In one embodiment, the first refractive index difference Δn1 may be greater than the second refractive index difference Δn2. Based on the principle of optics, when light is incident on the interface of two different refractive indices, if the light is incident from the high refractive index side, the greater the difference in refractive index, the smaller the critical angle of total reflection required, and the easier total reflection occurs, and the easier it is to have the effect of light converging effect of total reflection shown by the dotted arrow on the left in FIG. 3. If the light is incident from the low refractive index side, the refraction phenomenon may occur from the low refractive index material to the high refractive index material, and the larger the refractive index difference value is, the greater the degree of deflection occurs when the light is refracted, and as shown by the dotted arrow on the right in FIG. 3, the greater the convergence degree of light to the center area of the light-emitting elements 21 is. Therefore, when Δn1>Δn2, the anti-peeping display effect of the first display area AA1 and the large viewing angle display brightness of the second display area AA2 may be further improved. Moreover, the simulation experiment results also show that, when Δn1>Δn2, the anti-peeping display effect of the first display area AA1 and the display brightness of the second display area AA2 at a large viewing angle may be further improved.

Figure 12:
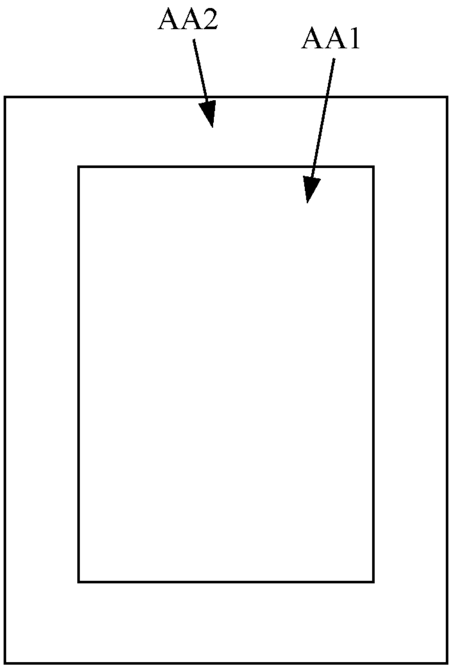
FIG. 12 illustrates a top view of another exemplary display panel according to various disclosed embodiments of the present disclosure.

FIG. 12 is a top view of an exemplary display panel provided by an embodiment of the present disclosure. As shown in FIG. 12, the second display area AA2 may surround the first display area AA1. As mentioned above, the first display area AA1 may have the anti-peeping effect, and may be configured to display some personal privacy-related display information to the user, and the second display area AA2 may have a larger viewing angle brightness at a large viewing angle, which may be convenient for the user to display the display information that needs to be shared to other people. In the embodiment of the present disclosure, the second display area AA1 may at least partially surround the first display area AA2, including but not limited to the manner shown in FIG. 12 where the second display area AA1 surrounds the first display area AA2.

In one embodiment of the present disclosure, the area of the first display area AA1 may be set to be larger than the area of the second display area AA2 such that the user may obtain display information through the larger area of the first display area AA1.

In one embodiment, as shown in FIG. 12, the second display area AA2 may surround the first display area AA1, and the area ratio between the second display area AA2 and the first display area AA1 may be approximately 1:2. Under such an area ratio, it may ensure that the user may have a large area of the first display area AA1 to obtain display information, and at the same time, it may also enable other personnel to have a sufficient area of the second display area AA2 to obtain display information.

Figure 13:
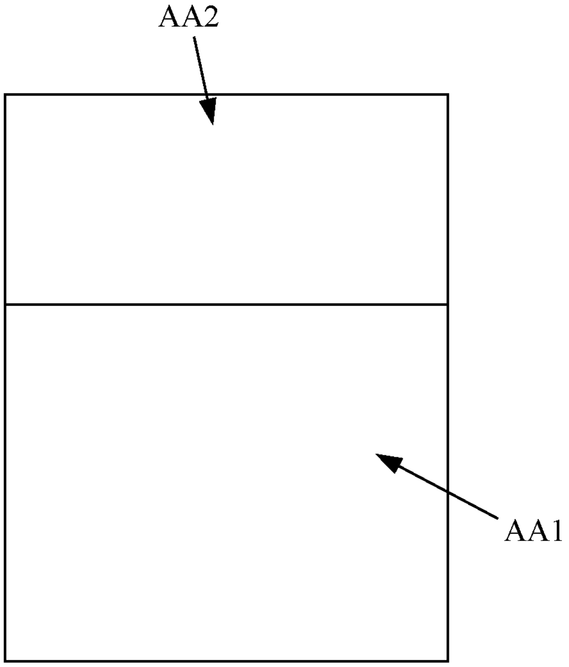
FIG. 13 illustrates a top view of another exemplary display panel according to various disclosed embodiments of the present disclosure.

FIG. 13 is a top view of another exemplary display panel provided by an embodiment of the present disclosure. As shown in FIG. 13, the second display area AA2 may be located on one side of the first display area AA1 and may surround a portion of the first display area AA1. In the manner shown in FIG. 13 and FIG. 14, it may be convenient for users and other personnel to view the display information in the first display area AA1 and the second display area AA2 at the two ends of the display panel respectively.

Figure 14:
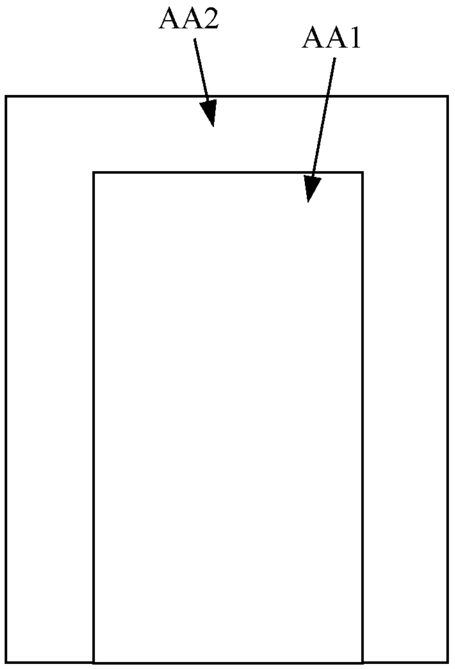
FIG. 14 illustrates a top view of another exemplary display panel according to various disclosed embodiments of the present disclosure.

FIG. 14 is a top view of another exemplary display panel provided by the embodiment of the present disclosure. As shown in FIG. 14, the second display area AA2 may surround three sides of the first display area AA1, and may be flush with the other side of the first display area AA1. The side of the first display area AA1 flush with the second display area AA2 may be the bottom side of the display panel. Generally, when the user holds the display panel to display images, the holding area may be at the lower end of the display panel. In this configuration, the second display area AA2 may surround the three sides of the first display area AA1, and the first display area AA1 and the second display area AA2 may be flush each other on the lower side of the display panel, which may be suitable for the user to hold the lower end of the display panel to share display information with other users through the second display area AA2 from time to time.

When the display panel includes a first display area AA1 and a second display area AA2, the relative position and area ratio of the first display area AA1 and the second display area AA2 are not limited to the limitations of this embodiment. The relative position and area ratio of the two may be set based on practical requirements.

Figure 15:
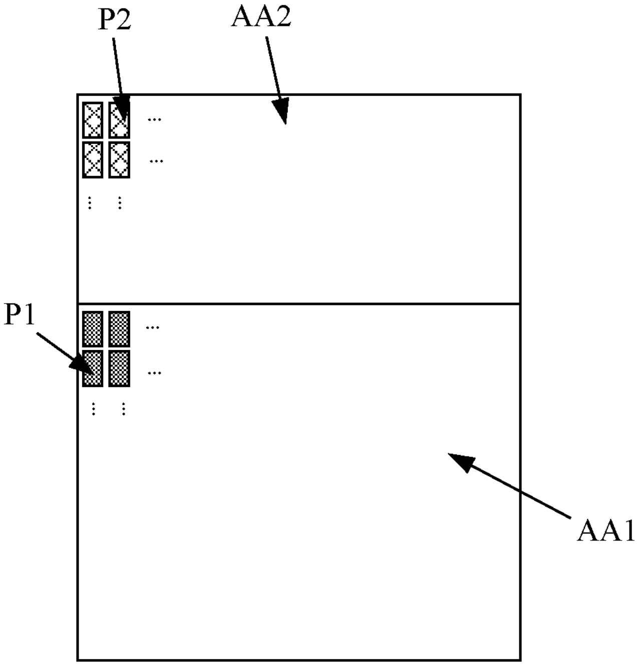
FIG. 15 illustrates a top view of another exemplary display panel according to various disclosed embodiments of the present disclosure.

FIG. 15 is a top view of another exemplary display panel provided by an embodiment of the present disclosure. As shown in FIG. 15, the light-emitting element 121 may include a first light-emitting element P1 located in the first display area AA1 and a second light-emitting element P2 located in the second display area AA2. The operation state of the second light emitting-element P2 of the display panel may include a first state and a second state. When the display panel is operated at the first state, the first light-emitting element P1 may emit light; and when the display panel is operated at the second state, both the first light-emitting element P1 and the second light-emitting element P2 may emit light. In this manner, the display device may be selected to work at the first state or at the second state based on requirements.

At the first state, the first light-emitting element P1 may be controlled to emit light, and the second light-emitting element P2 may be controlled not to emit light, such that the first display area AA1 may display images, and the second display area AA2 may not display images. Such a configuration may be used for the user to watch the displayed information through the display area AA1 without sharing the scene of the displayed information through the second display area AA2. As described in the above-mentioned embodiment, at the first state, the image display may be performed through the first display area AA1, which may realize the anti-peeping effect, thus the first state may be the anti-peeping state.

In the second state, both the first light-emitting element P1 and the second light-emitting element P2 may be controlled to emit light such that both the first display area AA1 and the second display area AA2 may display images. Under such a configuration, user may watch the displayed information through the first display area AA1, and may share the displayed information with other people around through the second display area AA2. As described in the above embodiment, at the second state, both the first display area AA1 and the second display area AA2 may display images, and the sharing of display information may be realized through the second display area AA2 with a large viewing angle. Thus, the second state may be a sharing state.

The first display area AA1 and the second display area AA2 may be set with a first display driving circuit and a second display driving circuit respectively. The first display driving circuit may be configured to control the first light-emitting element P1 to display images, and the second display driving circuit may be configured to control the second light-emitting element P2 to display images. The two display areas may have independent display driving circuits, and may independently perform display control such that the display panel may be selected to be in the first state or the second state based according to requirements.

It should be noted that, the way that the display panel has the first state and the second state is not limited to having one first display area AA1 and one second display area AA2, and may also be used in the following embodiments to have multiple first display areas AA1 and multiple second display areas AA2. The first display areas AA1 and the second display areas AA2 may display the same image, or display different images, or display different parts of a same image.

In one embodiment, there may be a plurality of first light-emitting elements P1 in the first display area AA1, and the first light-emitting elements P1 may be any one of green light-emitting elements, blue light-emitting elements and red light-emitting elements. In the second display area, there may be a plurality of second light-emitting elements P2, and the second light-emitting elements P2 may be any one of green light-emitting elements, blue light-emitting elements and red light-emitting elements.

In the embodiment of the present disclosure, when the display panel is operated at the second state, for the second display area AA2 and the first display area AA1 with the same light-emitting color, at the same gray scale, the driving current of the second light-emitting element P2 may be greater than the driving current of the first light-emitting element P1. As described in the above-mentioned embodiment, in the first display area AA1 and the second display area AA2, one or more parameters in the inclination angle, size difference and refractive index difference may be designed differently such that the first display area AA1 may have a brightness difference relative to the second display area AA1. If the display panel is used to look directly at the first display area AA1, it may have a smaller viewing angle relative to the first display area AA1 and a larger viewing angle relative to the second display area AA2, which may cause the user to perceive that the second display area AA2 may have lower brightness than the first display area AA1. In one embodiment, setting the driving current of the second light-emitting element P2 to be greater than that of the first light-emitting element P1 may reduce the brightness difference between the first display area AA1 and the second display area AA2 and improve the brightness uniformity of the displayed content perceived by the user.

The magnitudes of the driving currents may be controlled by the display driving circuits to adjust the display brightness of the two display regions.

Figure 16:
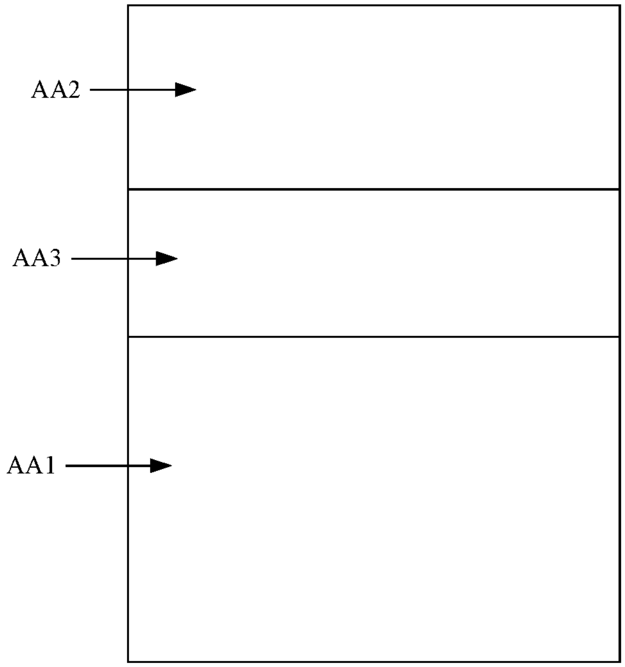
FIG. 16 illustrates a top view of another exemplary display panel according to various disclosed embodiments of the present disclosure.

In other manners, when the display panel is at the second display state, to improve the user's perception of the brightness uniformity of the first display area AA1 and the second display area AA2, the display panel may also be set as shown in FIG. 16.

FIG. 16 is a top view of another exemplary display panel provided by one embodiment of the present disclosure. As shown in FIG. 16, the display panel may include a third display area AA3. The third display area AA3 may be located between the first display area AA1 and the second display area AA2. When the display panel is operated at the second state, the brightness of the third display area AA3 at the first viewing angle may be between the brightness of the first display area AA1 at the first viewing angle and the brightness of the second display area AA2 at the first viewing angle. The ratio of the brightness of the first display area AA1 at the first viewing angle to the brightness of the first display area AA1 at the front viewing angle may be greater than 30%. By setting the third display area AA3 and setting a small first viewing angle, the brightness of the third display area AA3 may be between the brightness of the first display area AA1 and the brightness of the second display area AA2, and the third display area AA3 may be configurated as a transition area between the first display area AA1 and the second display area AA2 to prevent the first display area AA1 and the second display area AA2 from being directly adjacent to each other and resulting in a brightness boundary at the second state.

In addition, the ratio of the brightness of the first display area AA1 at the first viewing angle to the brightness of the first display area AA1 at the front viewing angle may be greater than 30% such that the brightness attenuation of the first display area AA1 at the small viewing angle relative to the brightness at the front viewing angle may be relatively smaller to ensure that the user may perceive a greater display brightness when the first display area AA1 displays images.

The brightnesses of the first display area AA1, the second display area AA2 and the third display area AA3 at the first viewing angle may be set by setting one or more parameters among the inclination angle, the size difference and the refractive index difference. Based on the layout of the first display area AA1 and the second display area AA2, the third display area AA3 may be set between the two, the layout of the three display areas is not limited to the one shown in FIG. 16, and may also be based on FIG. 12 and as shown in FIG. 14, for example, the third display area AA3 may be disposed between the first display area AA1 and the second display area AA2.

In one embodiment, along the direction from the first display area AA1 to the second display area AA2, the brightness of the third display area AA3 at the first viewing angle may gradually change from the brightness of the first display area AA1 at the first viewing angle to the brightness of the second display area AA2 at the first viewing angle. Setting the brightness of the third display area AA3 at the first viewing angle to gradually change in this direction may better realize the gradual brightness gradient effect of the first display area AA1 and the second display area AA2 and avoid the problem of abrupt brightness changes.

In the embodiment of the present disclosure, if only one first display area AA1 and one second display area AA2 are set, when the display panel is at the first state, and when the anti-peeping display is performed through the first display area AA1, the second display area AA2 may be at the black state causing the user to see a large area of the black state area, which may affect the perception. Based on this, in the embodiment of the present disclosure, the display panel may be set to have a plurality of first display areas AA1 and a plurality of second display areas AA2. Under the condition of ensuring the area ratio of the two, by the plurality of separated second display area, at the first state, it may avoid that the user sees a continuous large-area black state area.

Figure 17:
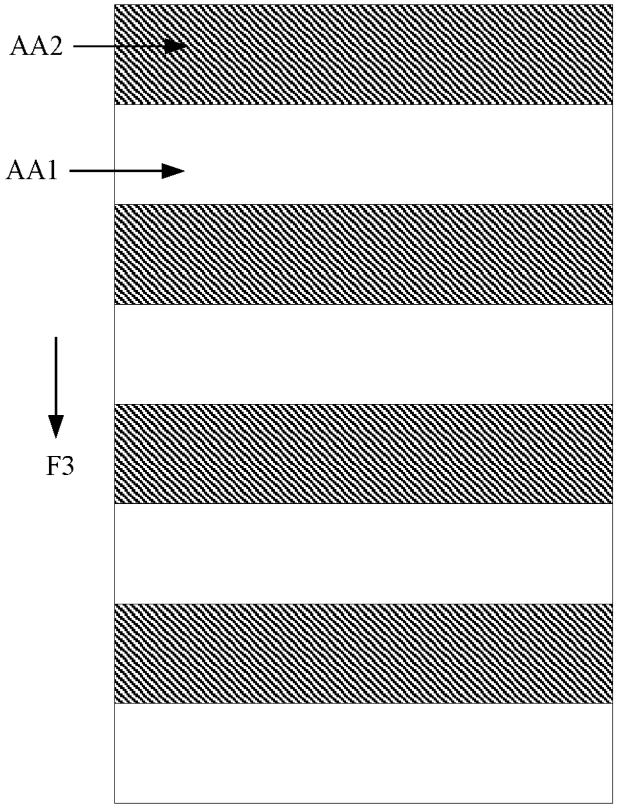
FIG. 17 illustrates a top view of another exemplary display panel according to various disclosed embodiments of the present disclosure.

FIG. 17 is a top view of another exemplary display panel provided by the embodiment of the present disclosure. As shown in FIG. 17, the display panel may include a plurality of first display areas AA1 and a plurality of second display areas AA2. The first display areas AA1 and the second display areas AA2 may be arranged staggered in a third preset direction F3. The third preset direction F3 may be parallel to the plane where the display panel is located. The third preset direction F3 may be at least one of the first preset direction F1 and the second preset direction F2 mentioned above, and the orientations of the three preset directions may be set based on requirements. The three directions may be set as a same direction, or may be set as different directions, or two of the three direction may be set as a same direction, which is different from the third direction of the three directions.

Figure 18:
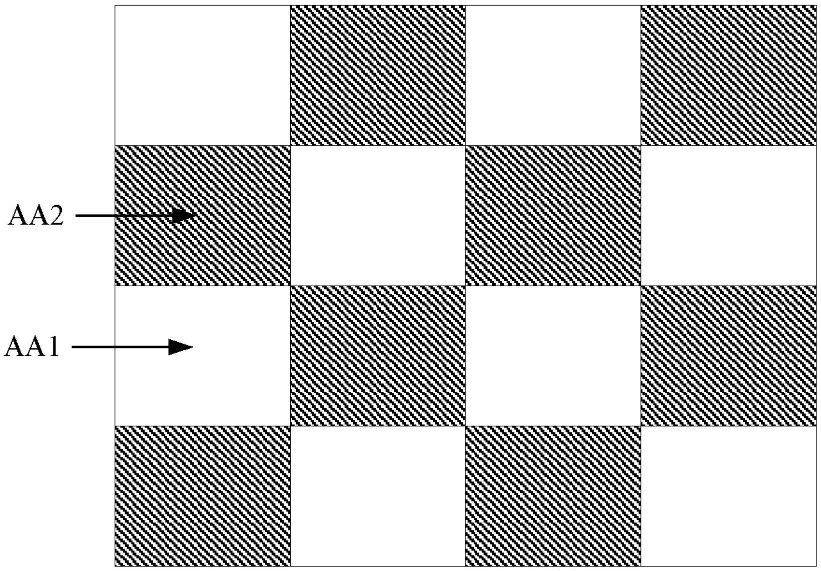
FIG. 18 illustrates a top view of another exemplary display panel according to various disclosed embodiments of the present disclosure.
Figure 19:
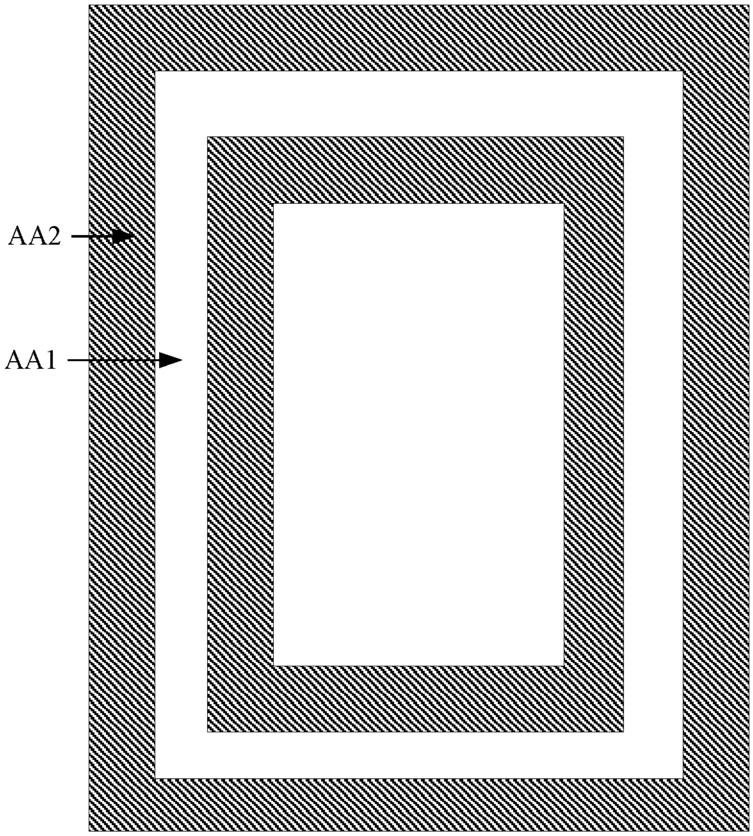
FIG. 19 illustrates a top view of another exemplary display panel according to various disclosed embodiments of the present disclosure.

When the display panel is set to have a plurality of first display areas AA1 and a plurality of second display areas AA2, the first display areas AA1 and the second display areas AA2 may not be limited to those arranged alternately in a straight line extending direction as shown in FIG. 17, the layout may also be arranged as shown in FIG. 18 and FIG. 19.

FIG. 18 is a top view of another exemplary display panel provided by the embodiment of the present disclosure. As shown in FIG. 18, the first display areas AA1 and the second display areas AA2 may be arranged in an array. In a same row, the first display areas AA1 and the second display areas AA2 may be alternately arranged, and in a same column, the first display areas AA1 and the second display areas AA2 may be alternately arranged.

FIG. 19 is a top view of another exemplary display panel provided by an embodiment of the present disclosure. As shown in FIG. 19, in a direction from the center of the display panel to the edge, i.e., the above-mentioned third preset direction F3, the first display areas AA1 and the second display areas AA2 may be alternately arranged. The central area of the display panel may be a first display area AA1, and along the direction from the center of the display panel to the edge, the second display area AA2 may surround the adjacent inner first display areas AA1.

It should be noted that, in the embodiment of the present disclosure, the first preset direction, the second preset direction and the third preset direction may be a same reference direction or different reference directions, which is not limited in the embodiment of the present disclosure.

In the display panel provided by the embodiment of the present disclosure, the first display area AA1 may have a large viewing angle anti-peeping display function, and the second display area AA2 may have a large viewing angle sharing display function. Therefore, the display panel may be selected to be at different display states based on different application scenarios.

For example, when it is determined that the private information needs to be displayed, the private information may be displayed through the first display area AA1. The private information may include payment program-related information, personal identity-related information, or password-related information, etc.

A processor may be configured to determine whether the to-be-displayed information is private information to automatically control whether to display the to-be-displayed information only through the first display area AA1, or, in response to the user's control instruction, a display area may be selected by the user to display the to-be-displayed information.

It can be known from the above description that the display panel provided by the embodiment of the present disclosure may perform the anti-peeping display through the first display area AA1 and share display through the second display area AA2. The display area for image display may be selected based on requirements.

As shown in any one of FIGS. 2-5 and FIG. 8*a*, in the embodiment of the present disclosure, the display panel may include a first display area AA1, and the brightness of the first display area AA1 at a first viewing angle may be greater than the brightness of the first display area AA1 at a second viewing angle. Further, the ratio of the brightness of the first display area AA1 at the second viewing angle to the brightness of the first display area AA1 at the front viewing angle may be not greater than 30%.

The angle between the first viewing angle and the first direction may be smaller than the angle between the second viewing angle and the first direction. The first direction may be perpendicular to the display panel. For example, the first viewing angle may be smaller than the second viewing angle.

As described in the first embodiment, in this embodiment, the brightness of the first display area AA1 under different viewing angles may also be adjusted by setting the first inclination angle θ1 and/or the first size difference d1 in the first display area AA1.

Setting the brightness of the first display area AA1 at the first viewing angle to be greater than the brightness of the first display area AA1 at the second viewing angle may make the first display area AA1 have a greater brightness at a smaller first viewing angle and have a smaller brightness at a large second viewing angle to realize the anti-peeping display effect of the large viewing angle, and ensure the normal image display of the front viewing angle or the small viewing angle to the user.

Setting the ratio of the brightness of the first display area AA1 at the second viewing angle to the brightness of the first display area AA1 at the front viewing angle not to be greater than 30% may make the first display area AA1 have a larger brightness attenuation at a large viewing angle. Therefore, the anti-peeping display effect of the first display area AA1 may be ensured.

In one embodiment, the display panel may further include a second display area AA2, and the brightness of the second display area AA2 at the second viewing angle may be greater than the brightness of the first display area AA1 at the second viewing angle. In such a configuration, at the second viewing angle, compared with the first display area AA1, the second display area AA2 may have a higher brightness, which may make the second display area AA2 have a sufficient brightness at a large viewing angle such that it may be convenient to perform shared display of the displayed information through the second display area AA2.

When the brightness of the second display area AA2 at the second viewing angle is greater than the brightness of the first display area AA1 at the second viewing angle, the ratio of the brightness of the second display area AA2 at the second viewing angle and the brightness of the first display area AA1 at the normal viewing angle may be greater than 30%. In such a configuration, when the light-emitting elements 121 of the same light-emitting color in the first display area AA1 and the second display area AA2 are displayed in the same gray scale, the brightness at the front viewing angle may be same. For a given display panel, the brightness at the front view angle of the first display area AA1 and the second display area AA2 may be a constant, and the brightness at the front view angle of first display areas AA1 and the second display area AA2 may be the same or different.

In the embodiment of the present disclosure, the ratio of the brightness of the second display area AA2 at the second viewing angle to the brightness of the first display area AA1 at the front viewing angle may be set to be greater than 30%, which may make the second display area AA2 have a larger brightness at a large viewing angle, such that when the image is displayed through the second display area AA2, at a large viewing angle, compared with the first display area AA1, the second display area AA2 may have a sufficient brightness to facilitate sharing display information through the second display area AA2.

In one embodiment, the ratio of the brightness of the second display area AA2 at the second viewing angle to the brightness of the second display area AA2 at the front viewing angle may be set to be greater than 30%. At a large viewing angle, the brightness attenuation of the second display area AA2 may be relatively small relative to its normal viewing angle. Thus the proportion of light emitted from the second display area AA2 at a large viewing angle may be increased to ensure a sufficient brightness at a large viewing angle.

In one embodiment, the display panel may include a first substrate 11, a light-emitting layer 12 and a light modulation layer 13. The light-emitting layer 12 may be located between the first substrate 11 and the light modulation layer 13. The light modulation layer 13 may include a first part and a second part. The first part may be located in the first display area AA1, and the second part may be located in the second display area AA2. The light modulation layer 13 may include a first light modulation layer 131 and a second light modulation layer 132.

The light-emitting layer 12 may include at least one light-emitting element 121. The first light modulation layer 131 may include at least one first opening K1, and the orthographic projection of the first opening K1 on the substrate 11 may overlap with the orthographic projection of the light-emitting element 121 on the first substrate 11. The second light modulation layer 132 may cover the first opening K1. The refractive index of the second light modulation layer 132 may be greater than the refractive index of the first light modulation layer 131. In the first part, there may be a first inclination angle θ1 between the tangent line of the contact point between the sidewall of the first opening K1 and the bottom of the first opening K1 and the bottom surface of the first light modulation layer 131. In the second part, there may be a second inclination angle θ2 between the tangent line of the contact point between the sidewall of the first opening K1 and the bottom of the first opening K1 and the bottom surface of the first light modulation layer 131. The first inclination angle θ1 and the second inclination angle θ2 may be different.

In this manner, by setting the angle ranges of the first inclination angle θ1 and the second inclination angle θ2, the first display area AA1 may realize the anti-peeping display, and the second display area AA2 may be configured for shared display. Value ranges of the first inclination angle θ1 and the second inclination angle θ2 may be same as those in the above-mentioned embodiments.

In another embodiment, the display panel may include a first substrate 11, a light-emitting layer 12, and a light modulation layer 13. The light-emitting layer 12 may be located between the first substrate 11 and the light modulation layer 13. The light modulation layer 13 may include a first part and a second part. The first part may be located in the first display area AA1, and the second part may be located in the second display area AA2. The light modulation layer 13 may include a first light modulation layer 131 and a second light modulation layer 132.

The light-emitting layer 12 may include at least one light-emitting element 121. The first light modulation layer 131 may include at least one first opening K1. The projection of the first opening K1 on the first the substrate 11 may overlap with the projection of the light-emitting element 121 on the first substrate 11. The second light modulation layer 132 may cover the first opening K1. The refractive index of the second light modulation layer 132 may be greater than the refractive index of the first light modulation layer 131. In the first part, the size of the first opening K1 in the first preset direction and the size of the light-emitting element 121 in the first preset direction may have a third size difference. In the second part, the size of the first opening K1 in the first preset direction and the size of the light-emitting element 121 in the first preset direction may have a fourth size difference. The third size difference may be different from the fourth size difference, and the first preset direction may include at least one direction parallel to the plane where the display panel is located.

In one embodiment, by setting the first display area AA1 and the second display area AA2 to correspond to different third size differences and fourth size differences respectively, the light modulation layer 13 may have different light modulation effects in the first display area AA1 and the second display area AA2, enabling the first display area AA1 to realize anti-peeping display, and enabling the second display area AA2 to be used for shared display. The absolute value of the third size difference may be in a range of approximately 0-2 microns, and the absolute value of the fourth size difference may be greater than 2 microns.

In another embodiment, the display panel may include a first substrate 11, a light-emitting layer 12, and a light modulation layer 13. The light-emitting layer 12 may be located between the first substrate 11 and the light modulation layer 13, and the light modulation layer 13 may include a first part and a second part. The first part may be located in the first display area, and the second part may be located in the second display area. The light modulation layer 13 may include a first light modulation layer 131 and a second light modulation layer 132. The light-emitting layer 12 may include at least one light-emitting element 121. The first light modulation layer 131 may include at least one first opening K1. The orthographic projection of the first opening K1 on the substrate 11 may overlap with the orthographic projection of the light-emitting element 121 on the first substrate 11, and the second light modulation layer 132 may cover the first opening K1. In the first part, the refractive index of the first light modulation layer 131 and the refractive index of the second light modulation layer 132 may have a first refractive index difference. In the second part, the refractive index of the first light modulation layer 131 and the refractive index of the second light modulation layer 132 have a second refractive index difference. The first refractive index difference and the second refractive index difference may be different.

In such a configuration, by setting a difference between the first refractive index and the second refractive index, the light modulation layer 13 in the first display area AA1 and the second display area AA2 may have different light modulation effects, such that the first display AA1 may realize anti-peeping display and the second display area AA2 may be configurated for shared display.

As described in the above embodiment, in this embodiment, the first difference may be set to be greater than the second difference, which may further improve the anti-peeping display effect of the first display area AA1 and the large viewing angle display brightness of the second display area AA2.

Figure 20:
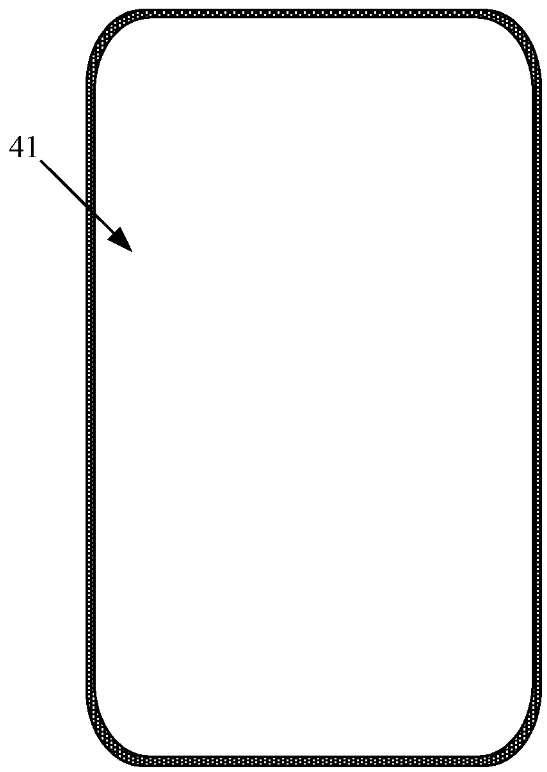
FIG. 20 illustrates an exemplary display device according to various disclosed embodiments of the present disclosure.

The present disclosure also provides a display device. FIG. 20 illustrates an exemplary display device consistent with various disclosed embodiments of the present disclosure.

As shown in FIG. 20, the display device may include a display panel 41. The display panel 41 may include the display panel provided in any implementation manner of the above-mentioned embodiments, or other appropriate display panel.

In one embodiment, the display device may be a display device with a display function such as a mobile phone, a computer, and a wearable device, etc. The display device may adopt the display panel 41 in the above embodiments, which may not only realize anti-peeping display through the first display area AA1, but also may perform shared display at a large viewing angle through the second display area AA2 based on demand.

The present disclosed display panel may include a first light modulation layer and a second light modulation layer. Based on the first light modulation layer and the second light modulation layer, a microlens structure (MLP) may be formed on the light-exiting side of the light-emitting element to adjust the propagation direction of the light emitted by the light-emitting element. Furthermore, the viewing angle of the first display area may be adjusted. In particular, the value of the first inclination angle between the tangent of the contact point between the sidewall of the first opening and the bottom of the first opening and the bottom surface of the first light modulation layer may be in a range of approximately 50°-60°. Within this angle range, the microlens structure on the light-exiting side of the light-emitting element in the first display area may make the light emitted by the light-emitting element emerge at a smaller angle, for example, it may increase the brightness of small viewing angles and reduce the brightness of large viewing angles. Thus, the viewing angle range of the first display area may be relatively small and the anti-peeping effect may be achieved when displaying images in the first display area.

Further, the brightness of the present disclosed display panel at the first viewing angle may be greater than the brightness of the first display area at the second viewing angle. Thus, when the display panel performs image display, the brightness at a small viewing angle may be greater than the brightness at a large viewing angle, and when the image is displayed in the first display area, and anti-peeping effect may be achieved when displayed. Moreover, the ratio of the brightness of the first display area at the second viewing angle to the brightness of the first display area at the front viewing angle may not be greater than 30%. Thus, the brightness attenuation of the first display area at a large viewing angle relative to the brightness of the first display area at a front viewing angle may be effectively large, and the brightness at a large viewing angle may be effectively reduced, and the anti-peeping effect of the first display area may be further improved effectively.

Each embodiment in this specification is described in a progressive, parallel, or progressive and parallel manner. Each embodiment focuses on the differences from other embodiments. The same and similar parts between the various embodiments may be referred to each other. As for the display device disclosed in the embodiment, because it may correspond to the display panel disclosed in the embodiment, the description may be relatively simple, and the relevant information may be referred to the description of the relevant parts of the display panel.

It should be noted that, in the description of the present disclosure, it should be understood that the orientation or positional relationship indicated by the terms “upper”, “lower”, “top”, “bottom”, “inner” and “outer” are based on the orientation or positional relationship shown in the drawings and is only for the convenience of describing the present disclosure and simplifying the description, and does not indicate or imply that the referred device or element must have a specific orientation, be constructed and operated in a specific orientation, and therefore cannot be understood as limitations on the present disclosure. When a component is said to be "connected" to another component, it may be directly connected to the other component or there may be a centered component at the same time.

It should also be noted that in this description, relational terms, such as first and second, etc., are only used to distinguish one entity or operation from another entity or operation, and do not necessarily require or imply that these entities or operations must have any such actual relationship or order. Moreover, the term "comprise", "include" or any other variation thereof is intended to cover a non-exclusive inclusion such that an article or device comprising a set of elements includes not only those elements but also other elements not expressly listed, or also include elements inherent in the article or device. Without further limitations, an element defined by the phrase "comprising a . . . " does not exclude the presence of additional identical elements in an article or device comprising the aforementioned element.

The above description of the disclosed embodiments is provided to enable any person skilled in the art to make or use the present disclosure. Various modifications to these embodiments will be readily apparent to those skilled in the art, and the general principles defined herein may be implemented in other embodiments without departing from the spirit or scope of the disclosure. Therefore, the present disclosure will not be limited to the embodiments shown herein, but is to be accorded the widest scope consistent with the principles and novel features disclosed herein.

What is claimed is:

1. A display panel, comprising:
- a first substrate;
- a light-emitting layer; and
- a light modulation layer,
- wherein:
  - the light-emitting layer is located between the first substrate and the light modulation layer;
  - the light modulation layer includes a first light modulation layer and a second light modulation layer;
  - the light-emitting layer includes at least one light-emitting element;
  - the first light modulation layer includes at least one first opening;
  - an orthographic projection of the at least one first opening on the first substrate overlaps with an orthographic projection of the at least one light-emitting element on the first substrate;
  - the second light modulation layer covers the at least one first opening;
  - a refractive index of the second light modulation layer is greater than a refractive index of the first light modulation layer;
  - the display panel includes a first display area;
  - the light modulation layer includes a first part;
  - the first part is located in the first display area;
  - in the first part, a first inclination angle is formed between a tangent of a contact point between a sidewall of a first one of the at least one first opening and a bottom of the first one of the at least one first opening and a bottom surface of the first light modulation layer; and
  - a value of the first inclination angle is in a range of being greater than 50° and less than 60°.

2. The display panel according to claim 1, wherein:
- the second light modulation layer also covers a surface of a side of the first light modulation layer away from the first substrate.

3. The display panel according to claim 1, wherein:
- in the first part, a size of the first one of the at least one first opening in a first preset direction and a size of a first one of the at least one light-emitting element in the first preset direction have a first size difference;
- an absolute value of the first size difference is in a range of approximately 0-2 microns; and
- the first preset direction includes at least one direction parallel to a plane where the display panel is located.

4. The display panel according to claim 1, further comprising:
- a second display area, wherein:
  - the light modulation layer includes a second part;
  - the second part is located in the second display area;
  - in the second part, a second inclination angle is formed between a tangent of a contact point between a sidewall of a second one of the at least one first opening and a bottom of the second one of the at least one first opening and the bottom surface of the first light modulation layer; and
  - the second inclination angle is less than approximately 50° or greater than approximately 60°.

5. The display panel according to claim 4, wherein:
- the second inclination angle is in a range of approximately 40°-50°, or approximately 60°-80°.

6. The display panel according to claim 4, wherein:
- in the second part, a size of the second one of the at least one first opening in a second preset direction and a size of a second one of the at least one light-emitting element in the second preset direction have a second size difference;
- an absolute value of the second size difference is greater than approximately 2 microns; and
- the second preset direction includes at least one direction parallel to a plane where the display panel is located.

7. The display panel according to claim 4, wherein:
- in the first part, the refractive index of the second light modulation layer and the refractive index of the first light modulation layer have a first refractive index difference;
- in the second part, the refractive index of the second light modulation layer and the refractive index of the first light modulation layer have a second refractive index difference; and
- the first refractive index difference and the second refractive index difference are different.

8. The display panel according to claim 7, wherein:
- the first refractive index difference is greater than the second refractive index difference.

9. The display panel according to claim 4, wherein:
- the second display area at least partially surrounds the first display area.

10. The display panel according to claim 4, wherein the at least one light-emitting element comprises:
- a first light-emitting element located in the first display area; and
- a second light-emitting element located in the second display area,
- wherein:
  - an operation state of the display panel includes a first state and a second state;
  - when the display panel is operated at the first state, the first light-emitting element emits light; and
  - when the display panel is operated at the second state, both the first light-emitting element and the second light-emitting element emit light.

11. The display panel according to claim 10, wherein:
when the display panel is operated at the second state, for the first light-emitting element and the second light-emitting element of a same light emitting color, at a same gray scale, a driving current of the second light-emitting element is greater than a driving current of the first light-emitting element.

12. The display panel according to claim 10, further comprising:
a third display area located between the first display area and the second display area, wherein:
when the display panel is operated at the second state, a brightness of the third display area at a first viewing angle is between a brightness of the first display area at the first viewing angle and a brightness of the second display area at the first viewing angle; and
a ratio of the brightness of the first display area at the first viewing angle to the brightness of the first display area at a normal viewing angle is greater than approximately 30%.

13. The display panel according to claim 4, further comprising:
a plurality of first display areas and a plurality of second display areas alternatively distributed along a third preset direction, wherein the third preset direction is parallel to a plane with the display panel is located.

14. A display panel, comprising:
a first display area; and
a light modulation layer,
wherein:
the light modulation layer includes a first part;
the first part is located in the first display area;
the light modulation layer includes a first light modulation layer;
the first light modulation layer includes at least one first opening;
in the first part, a first inclination angle is formed between a tangent of a contact point between a sidewall of a first one of the at least one first opening and a bottom of the first one of the at least one first opening and a bottom surface of the first light modulation layer;
a value of the first inclination angle is in a range of approximately being greater than 50° but being less than 60°;
a brightness of the first display area at a first viewing angle is greater than a brightness of the first display area at a second viewing angle;
a ratio of the brightness of the first display area at the second viewing angle to the brightness of the first display area under a normal viewing angle is not more than 30%;
an angle between the first viewing angle and a first direction is smaller than an angle between the second viewing angle and the first direction; and
the first direction is perpendicular to the display panel.

15. The display panel according to claim 14, further comprising:
a second display area, wherein a brightness of the second display area at the second viewing angle is greater than a brightness of the first display area at the second viewing angle.

16. The display panel according to claim 15, wherein:
a ratio of the brightness of the second display area at the second viewing angle to the brightness of the first display area at the normal viewing angle is not more than 30%.

17. The display panel according to claim 15, further comprising:
a first substrate; and
a light-emitting layer,
wherein:
the light-emitting layer is located between the first substrate and the light modulation layer;
the light modulation layer further includes a second part;
the second part is located in the second display area;
the light modulation layer further includes a second light modulation layer;
the light-emitting layer includes at least one light-emitting element;
an orthographic projection of the at least one first opening on the first substrate overlaps with an orthographic projection of the at least one light-emitting element on the first substrate;
the second light modulation layer covers the at least one first opening;
a refractive index of the second light modulation layer is greater than a refractive index of the first light modulation layer;
in the second part, a second inclination angle is formed between a tangent of a contact point of the sidewall of a second one of the at least one first opening and the bottom of the second one of the at least one first opening and the bottom surface of the first light modulation layer; and
the first inclination angle is different from the second inclination angle.

18. The display panel according to claim 15, further comprising:
a first substrate; and
a light-emitting layer,
wherein:
the light-emitting layer is located between the first substrate and the light modulation layer;
the light modulation layer further includes a second part;
the second part is located in the second display area;
the light modulation layer further includes a second light modulation layer;
the light-emitting layer includes at least one light-emitting element;
an orthographic projection of the at least one first opening on the first substrate overlaps with an orthographic projection of the at least one light-emitting element on the first substrate;
the second light modulation layer covers the at least one first opening;
a refractive index of the second light modulation layer is greater than a refractive index of the first light modulation layer;
in the first part, a size of the first one of the at least one first opening in a first preset direction and a size of a first one of the at least one the light-emitting element in the first preset direction have a third size difference;
in the second part, a size of a second one of the at least one first opening in the first preset direction and a size of a second one of the at least one light-emitting element in the first preset direction have a fourth size difference;
the third size difference is different from the fourth size difference; and the first preset direction includes at least one direction parallel to a plane where the display panel is located.

19. The display panel according to claim 15, further comprising:

a first substrate; and a light-emitting layer, wherein:

the light-emitting layer is located between the first substrate and the light modulation layer;

the light modulation layer further includes a second part;

the second part is located in the second display area;

the light modulation layer further includes a second light modulation layer;

the light-emitting layer includes at least one light-emitting element;

an orthographic projection of the first opening on the at least one first substrate overlaps with an orthographic projection of the at least one light-emitting element on the first substrate;

the second light modulation layer covers the at least one first opening;

in the first part, a first refractive index of the first light modulation layer and a first refractive index of the second light modulation layer have a first refractive index difference;

in the second part, a second refractive index of the first light modulation layer and a second refractive index of the second light modulation layer have a second refractive index difference; and the first refractive index difference is different from the second refractive index difference.

20. A display device, comprising:

a display panel including:

a first substrate;

a light-emitting layer; and a light modulation layer, wherein:

the light-emitting layer is located between the first substrate and the light modulation layer;

the light modulation layer includes a first light modulation layer and a second light modulation layer;

the light-emitting layer includes at least one light-emitting element;

the first light modulation layer includes at least one first opening;

an orthographic projection of the at least one first opening on the first substrate overlaps with an orthographic projection of the at least one light-emitting element on the first substrate;

the second light modulation layer covers the first opening;

a refractive index of the second light modulation layer is greater than a refractive index of the first light modulation layer;

the display panel includes a first display area;

the light modulation layer includes a first part;

the first part is located in the first display area;

in the first part, a first inclination angle is formed between a tangent of the contact point between a sidewall of the at least one first opening and a bottom of the at least one first opening and a bottom surface of the first light modulation layer; and a value of the first inclination angle is in a range of being greater than 50° and less than 60°.

* * * * *